(12) United States Patent
Tsunooka

(10) Patent No.: US 8,417,438 B2
(45) Date of Patent: Apr. 9, 2013

(54) APPARATUS FOR DETECTING AIR-FUEL RATIO DISPERSION ABNORMALITY BETWEEN CYLINDERS OF MULTIPLE-CYLINDER INTERNAL COMBUSTION ENGINE

(75) Inventor: Takashi Tsunooka, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/319,613

(22) PCT Filed: Dec. 8, 2010

(86) PCT No.: PCT/JP2010/007149
§ 371 (c)(1),
(2), (4) Date: Nov. 9, 2011

(87) PCT Pub. No.: WO2012/077164
PCT Pub. Date: Jun. 14, 2012

(65) Prior Publication Data
US 2012/0185157 A1     Jul. 19, 2012

(51) Int. Cl.
*B60T 7/12*      (2006.01)
*G05D 1/00*      (2006.01)
*G06F 7/00*      (2006.01)
*G06F 17/00*     (2006.01)
*F02D 23/00*     (2006.01)

(52) U.S. Cl. .......................................... 701/105; 60/602
(58) Field of Classification Search ............... 701/102, 701/103, 105, 109, 115; 60/277, 280, 285, 60/597, 602
See application file for complete search history.

(56) References Cited

U.S. PATENT DOCUMENTS 8,051,835 B2 * 11/2011 Soejima et al. .......... 123/406.45
(Continued)

FOREIGN PATENT DOCUMENTS

| JP | 2002 242637 | 8/2002 |
|---|---|---|
| JP | 2005 023865 | 1/2005 |

(Continued)

OTHER PUBLICATIONS

International Search Report Issued Mar. 22, 2011 in PCT/JP10/007149 Filed Dec. 8, 2010.

*Primary Examiner* — Stephen K Cronin
*Assistant Examiner* — Sizo Vilakazi
(74) *Attorney, Agent, or Firm* — Oblon, Spivak, McClelland, Maier & Neustadt, L.L.P.

(57) ABSTRACT

An apparatus for detecting dispersion abnormality in air-fuel ratio between cylinders of a multiple-cylinder engine, including a waste gate passage which bypasses a turbine of a turbocharger, a waste gate valve which opens/closes the passage, an air-fuel ratio sensor installed in an exhaust passage on the downstream of an outlet of the passage, an abnormality detecting unit for detecting dispersion abnormality in air-fuel ratio between cylinders by comparing a parameter value correlating with a fluctuation of the sensor value with a predetermined threshold, and an exhaust speed increasing unit for increasing exhaust gas speed. The apparatus further includes a controller which controls the valve and the exhaust speed increasing unit, and the controller opens, when dispersion abnormality in the air-fuel ratio between cylinders is detected, the valve and increases exhaust speed by the exhaust speed increasing unit.

3 Claims, 9 Drawing Sheets

U.S. PATENT DOCUMENTS

| | | | |
|---|---|---|---|
| 2007/0006830 A1* | 1/2007 | Yasui et al. | 123/90.15 |
| 2009/0292446 A1* | 11/2009 | Tanaka | 701/103 |
| 2010/0017098 A1* | 1/2010 | Fukuchi et al. | 701/103 |
| 2010/0071658 A1* | 3/2010 | Soejima et al. | 123/406.19 |
| 2011/0094480 A1* | 4/2011 | Suhocki et al. | 123/564 |
| 2011/0138807 A1* | 6/2011 | Ulrey et al. | 60/605.1 |

FOREIGN PATENT DOCUMENTS

| | | |
|---|---|---|
| JP | 2008 208740 | 9/2008 |
| JP | 2009 128273 | 6/2009 |
| JP | 2009 209747 | 9/2009 |
| JP | 2010 024977 | 2/2010 |

* cited by examiner

APPARATUS FOR DETECTING AIR-FUEL RATIO DISPERSION ABNORMALITY BETWEEN CYLINDERS OF MULTIPLE-CYLINDER INTERNAL COMBUSTION ENGINE

TECHNICAL FIELD

The present invention relates to an apparatus that detects dispersion abnormality of an air-fuel ratio between cylinders of a multiple-cylinder internal combustion engine, and particularly to a device that detects relatively large dispersion in an air-fuel ratio between cylinders in a multiple-cylinder internal combustion engine.

BACKGROUND ART

In an internal combustion engine provided with an exhaust purification system using a catalyst in general, in order to efficiently perform purification of a harmful component in an exhaust gas by a catalyst, control of a mixing ratio between air and fuel in a mixture to be burned in an internal combustion engine, that is, an air-fuel ratio, is indispensable. An air-fuel ratio sensor is provided in an exhaust passage of the internal combustion engine in order to control such an air-fuel ratio, and the air-fuel ratio detected thereby is subjected to feedback control so as to match a predetermined target air-fuel ratio.

On the other hand, in a multiple-cylinder internal combustion engine, since the air-fuel ratio control is usually executed by using the same control amount for all the cylinders, even if the air-fuel ratio control is executed, the actual air-fuel ratio might be dispersed among the cylinders. In such a case, if the degree of the dispersion is small, it can be absorbed by the air-fuel ratio feedback control, and a harmful component in the exhaust gas can be also purified by a catalyst, and thus, exhaust emission is not influenced and a particular problem does not occur.

However, if the air-fuel ratio between cylinders are largely dispersed due to, for example, a failure in a fuel injection system of some cylinders, the exhaust emission is deteriorated, which causes a problem. Such a large degree of dispersion in the air-fuel ratio that deteriorates the exhaust emission is preferably detected as abnormality. Particularly, in the case of an internal combustion engine for an automobile, in order to prevent driving of a vehicle with deteriorated exhaust emission, detection of abnormality in dispersion of the air-fuel ratio between cylinders onboard is in demand, and recently, there is also a movement to legislate this detection.

In the device described in Patent Literature 1 for example, a value of dispersion ratio, which is a degree of dispersion in an air-fuel ratio between cylinders, is acquired from a trajectory length or a trajectory area of an output of an air-fuel ratio sensor by using a map or a function determined in advance.

Citation List

Patent Literature

PTL 1: Japanese Patent Laid-Open No. 2009-209747
PTL 2: Japanese Patent Laid-Open No. 2008-208740
PTL 3: Japanese Patent Laid-Open No. 2002-242637

SUMMARY OF INVENTION

Technical Problem

However, in an internal combustion engine having a turbo charger, if the air-fuel ratio sensor is disposed on the downstream side of a turbine of the turbo charger, exhaust gas is agitated by passage of the exhaust emitted from each cylinder through the turbine, which leads to a possibility that the dispersion cannot be detected with accuracy.

In the device disclosed in Patent Literature 2, by agitating the exhaust gas with a waste gate valve of the turbo charger in a closed state, the air-fuel ratio is made uniform even if the air-fuel ratio is dispersed among the cylinders. However, the idea of using an air-fuel ratio sensor output when the waste gate valve is brought into the open state is neither disclosed nor suggested.

In the device disclosed in Patent Literature 3, by advancing the angle of an opening timing of an exhaust valve, an exhaust-gas flow velocity is increased. But the idea of using the exhaust-gas flow velocity for detection of the air-fuel ratio is neither disclosed nor suggested.

The present invention was made in view of the above circumstances, and has an object to improve detection accuracy and to provide a device for detecting dispersion abnormality in air-fuel ratio between cylinders of a multiple-cylinder internal combustion engine that can prevent misdetection.

Solution to Problem

In one aspect of the present invention, there is provided an apparatus for detecting dispersion abnormality in air-fuel ratio between cylinders of a multiple-cylinder internal combustion engine, the device including:
a turbo charger installed in association with the multiple-cylinder internal combustion engine;
a waste gate passage which bypasses a turbine of the turbo charger;
a waste gate valve which opens/closes the waste gate passage;
an air-fuel ratio sensor installed in the exhaust passage on the downstream side rather than an outlet of the waste gate passage;
an abnormality detecting means configured to detect dispersion abnormality in air-fuel ratio between cylinders by comparing a value of a parameter correlating with a degree of fluctuation of an output of the air-fuel ratio sensor with a predetermined abnormality threshold value; and
an exhaust speed increasing means configured to increase the speed of an exhaust flow, and further including:
a controller which controls the waste gate valve and the exhaust speed increasing means is further provided; wherein
the controller brings, when dispersion abnormality in the air-fuel ratio between cylinders is detected, the waste gate valve into an open state and increases the speed of the exhaust flow by the exhaust speed increasing means.

The exhaust speed increasing means preferably executes, when the dispersion abnormality in the air-fuel ratio between cylinders is detected, at least one of:
advancing of opening timing of an exhaust valve rather than that in a usual operation;
setting of the opening timing of the exhaust valve during an exhaust stroke; and
setting an opening degree of the exhaust valve smaller than that in the usual operation.

The multiple-cylinder internal combustion engine preferably has a plurality of exhaust valves in a single combustion chamber; and
the exhaust speed increasing means stops some of the plurality of exhaust valves in the closed state when dispersion abnormality in the air-fuel ratio between cylinders is detected.

Advantageous Effects of Invention

According to the present invention, such excellent advantages can be exerted that an influence of agitation of the exhaust by a turbine is suppressed so as to improve detection accuracy, and misdetection can be prevented.

DESCRIPTION OF EMBODIMENTS

Embodiments of the present invention will be described below by referring to the attached drawings.

Figure 1:
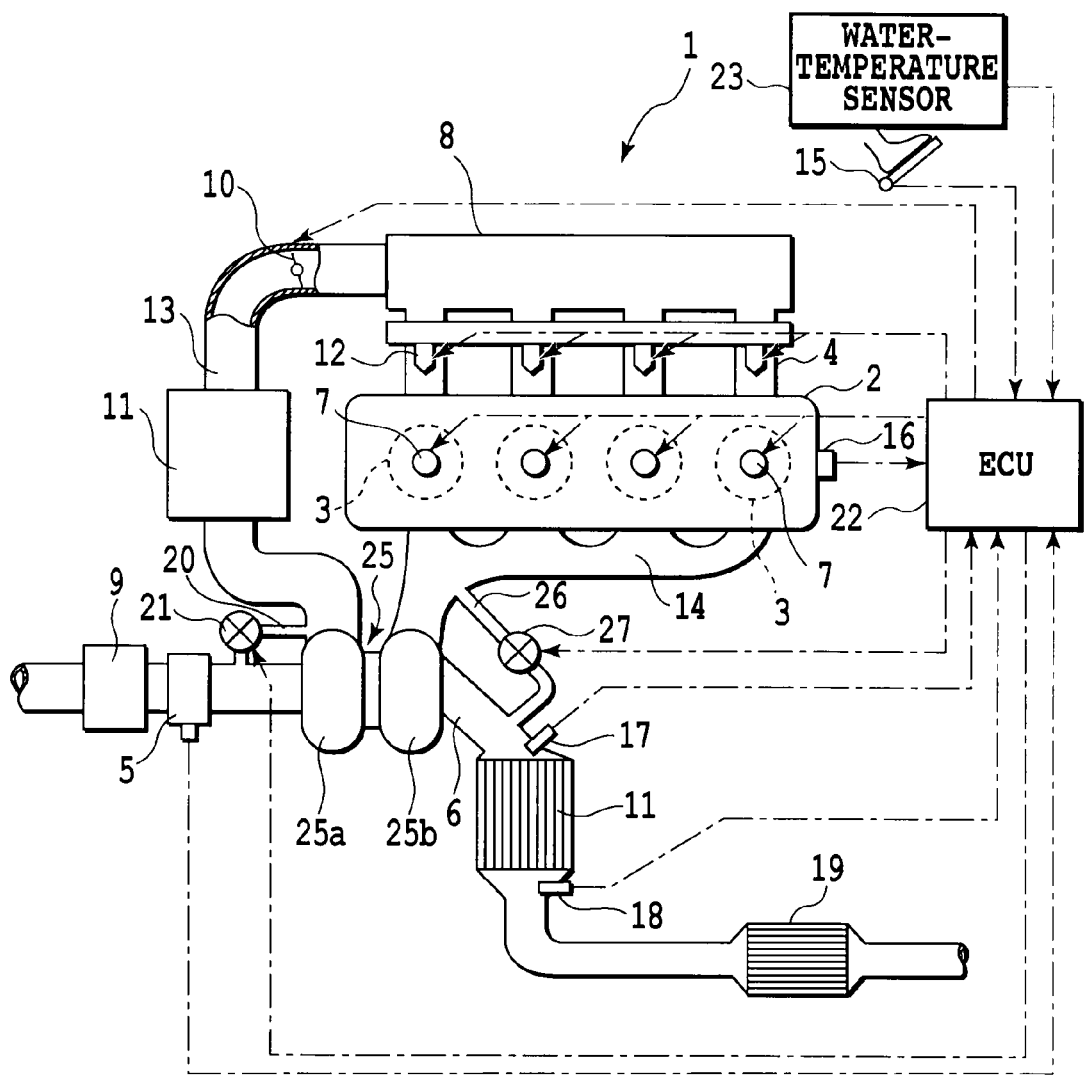
FIG. 1 is an outline diagram of an internal combustion engine according to a first embodiment of the present invention.

FIG. 1 is an outline diagram of an internal combustion engine according to this embodiment. As illustrated, an internal combustion engine (engine) 1 burns a mixture of fuel and air within a combustion chamber 3 formed in a cylinder block 2 and reciprocally moves a piston in the combustion chamber 3 so as to generate power. The internal combustion engine 1 of this embodiment is a multiple-cylinder internal combustion engine mounted on an automobile, and more specifically, a spark-ignition type internal combustion engine having in-line four cylinders, that is, a gasoline engine. However, the internal combustion engine to which the present invention can be applied is not limited to that type, but the number of cylinders, type and the like are not particularly limited as long as it is a multiple-cylinder internal combustion engine.

Though not shown, an intake valve that opens/closes an intake port, and an exhaust valve that opens/closes an exhaust port, are disposed in each cylinder in a cylinder head of the internal combustion engine 1, and each of the intake valves and each of the exhaust valves are opened/closed by a cam shaft or a solenoid actuator. At the top part of the cylinder head, an ignition plug that ignites the mixture in the combustion chamber 3 is mounted for each cylinder.

The intake port of each cylinder is connected to a surge tank 8, which is an intake converging room, through a branch pipe 4 for each cylinder. An intake pipe 13 is connected to the upstream side of the surge tank 8, and the intake pipe 13 is connected to an outlet of a compressor 25a of a turbo charger 25. An inlet of the compressor 25a is connected to an air cleaner 9. In the intake pipe 13, an airflow meter 5 that detects an intake air amount (an amount of intake air per unit time, that is, an intake flow-rate), and an electronically controlled throttle valve 10 are incorporated. The intake port, the branch pipe 4, the surge tank 8, and the intake pipe 13 form an intake passage. In the periphery of the intake pipe 13, an intercooler 26 that cools the intake air flowing through the intake pipe 13 is disposed. Engine cooling water is led into the intercooler 26, and the intake air is cooled by the engine cooling water. An air-bypass passage 20 and an electronically-controlled air-bypass valve (ABV) 21 that opens/closes the same are installed so as to bypass the compressor 25a of the turbo charger 25. This ABV 21 prevents the pressure on the upstream side of the throttle valve 10 from temporarily rising rapidly when the throttle valve 10 is rapidly closed and hence, prevents generation of a surge noise from the turbo charger 25.

An injector (fuel injection valve) 12 that injects fuel into the intake passage or particularly in the intake port is disposed in each cylinder. The fuel injected from the injector 12 is mixed with intake air so as to form mixture, and this mixture is taken into the combustion chamber 3 when the intake valve is open, compressed by the piston, and ignited and burned by the ignition plug 7.

On the other hand, the exhaust port of each cylinder is connected to an exhaust manifold 14. The exhaust manifold 14 is formed of a branch pipe for each cylinder forming the upstream portion thereof, and an exhaust converging portion forming the downstream portion thereof. The downstream side of the exhaust converging portion is connected to an inlet of an exhaust turbine 25b of the turbo charger 25. An outlet of the exhaust turbine 25b is connected to the exhaust pipe 6. The exhaust port, the exhaust manifold 14, and the exhaust pipe 6 form an exhaust passage. In the exhaust pipe 6, a waste gate passage 26 and an electronically-controlled waste gate valve (WGV) 27 that opens/closes the same are installed so as to bypass the exhaust turbine 25b of the turbo charger 25.

In the exhaust pipe 6, catalysts formed of three-way catalysts, respectively, that is, an upstream catalyst 11 and a downstream catalyst 19 are mounted in series. On the upstream side and the downstream side of the upstream catalyst 11, a pre-catalyst sensor 17 and a post-catalyst sensor 18 are installed for detecting an air-fuel ratio of the exhaust gas, respectively. The pre-catalyst sensor 17 and the post-catalyst sensor 18 are installed at positions immediately before and immediately after the upstream catalyst 11 and detect the air-fuel ratio on the basis of oxygen concentration in the exhaust gas. The pre-catalyst sensor 17 corresponds to the "air-fuel ratio sensor" in the present invention and is installed in the exhaust pipe 6 on the downstream side of the outlet of the waste gate passage 26.

The above-described ignition plug 7, the throttle valve 10, the injector 12 and the like are electrically connected to an electronic control unit (hereinafter referred to as an ECU) 22 as a controller. The ECU 22 includes a CPU, a ROM, a RAM, input/output ports, a storage device and the like, none of them shown. Also, to the ECU 22, as illustrated in the figure, in addition to the above-described airflow meter 5, the pre-catalyst sensor 17 and the post-catalyst sensor 18, a crank angle sensor 16 that detects a crank angle of the internal combustion engine 1, an accelerator opening-degree sensor 15 that detects an accelerator opening-degree, a water-temperature sensor 23 that detects the temperature of cooling water of the internal combustion engine 1, and other various sensors are electrically connected through a not shown A/D converter or the like. The ECU 22 controls ignition timing, a throttle opening-degree, a fuel injection amount, fuel injection timing and the like by controlling the ignition plug 7, the throttle valve 10, the injector 12 and the like on the basis of detected values of the various sensors and the like so as to obtain a desired output. The throttle opening-degree is usually controlled to an opening degree according to the accelerator opening-degree. The ECU 22 also controls the ABV 21 and the WGV 27 so as to bypass the intake and the exhaust as necessary.

Figure 2:
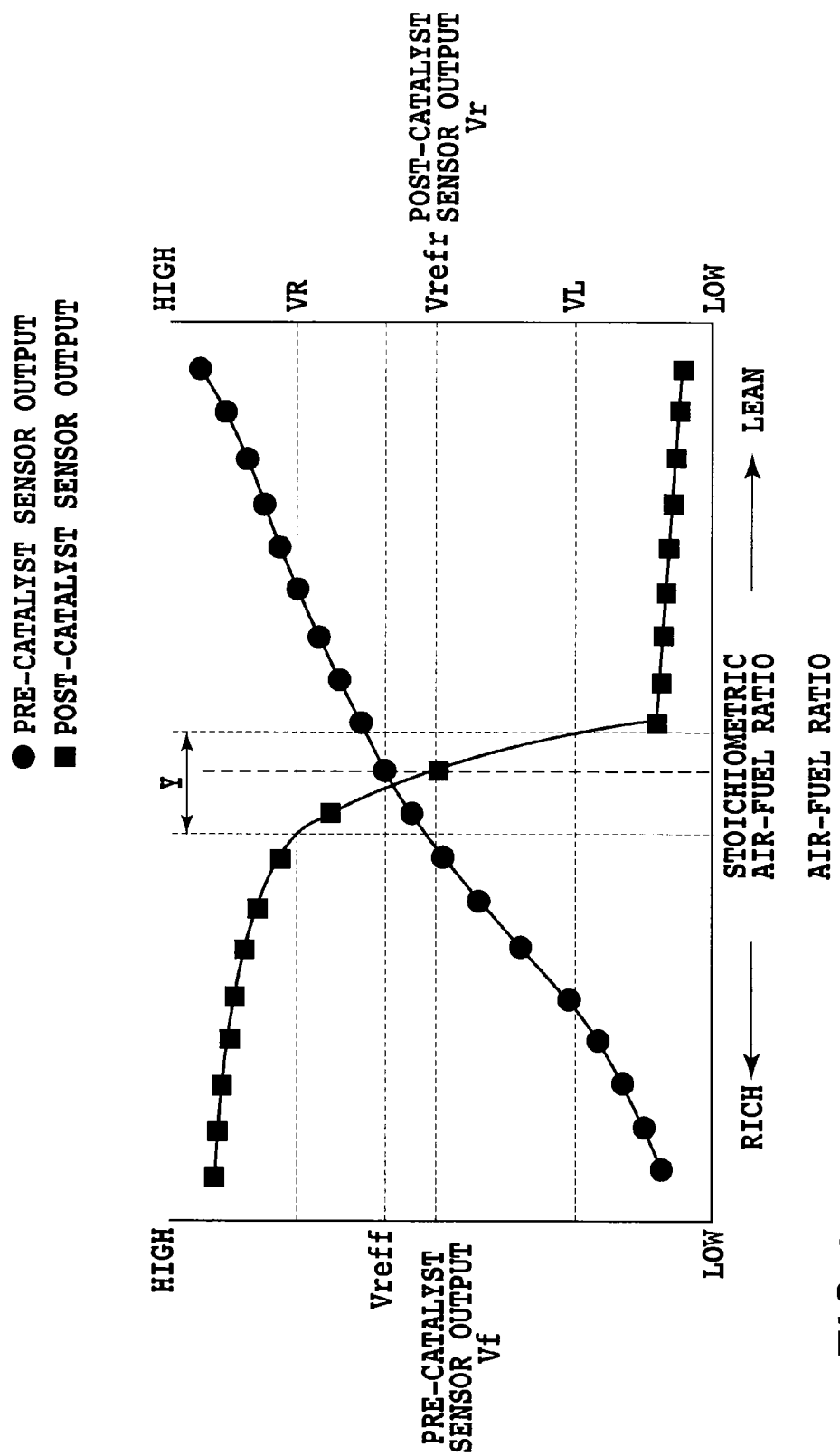
FIG. 2 is a graph illustrating output characteristics of a pre-catalyst sensor and a post-catalyst sensor.

The pre-catalyst sensor 17 is formed of a so-called wide-range air-fuel ratio sensor and can continuously detect the air-fuel ratio over a relatively wide range. FIG. 2 shows output characteristics of the pre-catalyst sensor 17. As illustrated in the figure, the pre-catalyst sensor 17 outputs a voltage signal Vf having a magnitude in proportion with a detected exhaust air-fuel ratio (pre-catalyst air-fuel ratio A/Ff). The output voltage when the exhaust air-fuel ratio is stoichiometric (theoretical air-fuel ratio or A/F=14.6, for example) is Vreff (approximately 3.3 V, for example).

On the other hand, the post-catalyst sensor 18 is formed of a so-called $O_2$ sensor and has a characteristic in which an output value is rapidly changed at the stoichiometric point. FIG. 2 shows output characteristics of the post-catalyst sensor 18. As illustrated in the figure, the output voltage when the exhaust air-fuel ratio (post-catalyst air-fuel ratio A/Fr) is stoichiometric, that is, a stoichiometric-equivalent value is Vrefr (0.45 V, for example). The output voltage of the post-catalyst sensor 18 varies within a predetermined range (0 to 1 (V), for example). If the exhaust air-fuel ratio is leaner than the stoichiometric ratio, the output voltage of the post-catalyst sensor becomes lower than the stoichiometric-equivalent value Vrefr, while if the exhaust air-fuel ratio is richer than the stoichiometric ratio, the output voltage of the post-catalyst sensor becomes higher than the stoichiometric-equivalent value Vrefr.

The upstream catalyst 11 and the downstream catalyst 19 purify NOx, HC and CO, which are harmful components in the exhaust gas, at the same time, when the air-fuel ratio A/F of the exhaust gas flowing thereinto, respectively, is in the vicinity of the stoichiometric ratio. A width of the air-fuel ratio (window) in which these three components can be purified at the same time with high efficiency is relatively narrow.

The air-fuel ratio control (stoichiometric control) is executed by the ECU 22 so that the air-fuel ratio of the exhaust gas flowing into the upstream catalyst 11 is controlled to the vicinity of the stoichiometric ratio. This air-fuel ratio control is constituted by main air-fuel ratio control (main air-fuel ratio feedback control) in which the exhaust air-fuel ratio detected by the pre-catalyst sensor 17 is matched with the stoichiometric ratio, which is a predetermined target air-fuel ratio, and a sub air-fuel ratio control (sub air-fuel ratio feedback control) in which the exhaust air-fuel ratio detected by the post-catalyst sensor 18 is matched with the stoichiometric ratio.

It is assumed that the injector 12 of some of the all cylinders fails and dispersion (i.e. imbalance) occurs in the air-fuel ratio between the cylinders. For example, #1 cylinder has a fuel injection amount larger than the other #2, #3, and #4 cylinders, and the air-fuel ratio thereof is largely shifted to the rich side or the like. Even at this time, by giving a relatively large correction amount by the above-described main air-fuel ratio feedback control, the air-fuel ratio of total gas supplied to the pre-catalyst sensor 17 can be controlled to the stoichiometric value in some cases. However, when seen by each cylinder, the #1 cylinder is largely richer than the stoichiometric value, and the #2, #3, and #4 cylinders are leaner than the stoichiometric value, which results in stoichiometric in general balance, and it is obvious that the control is not preferable in view of emission. Thus, in this embodiment, a device that detects dispersion abnormality in air-fuel ratio between cylinders is equipped.

Figure 3:
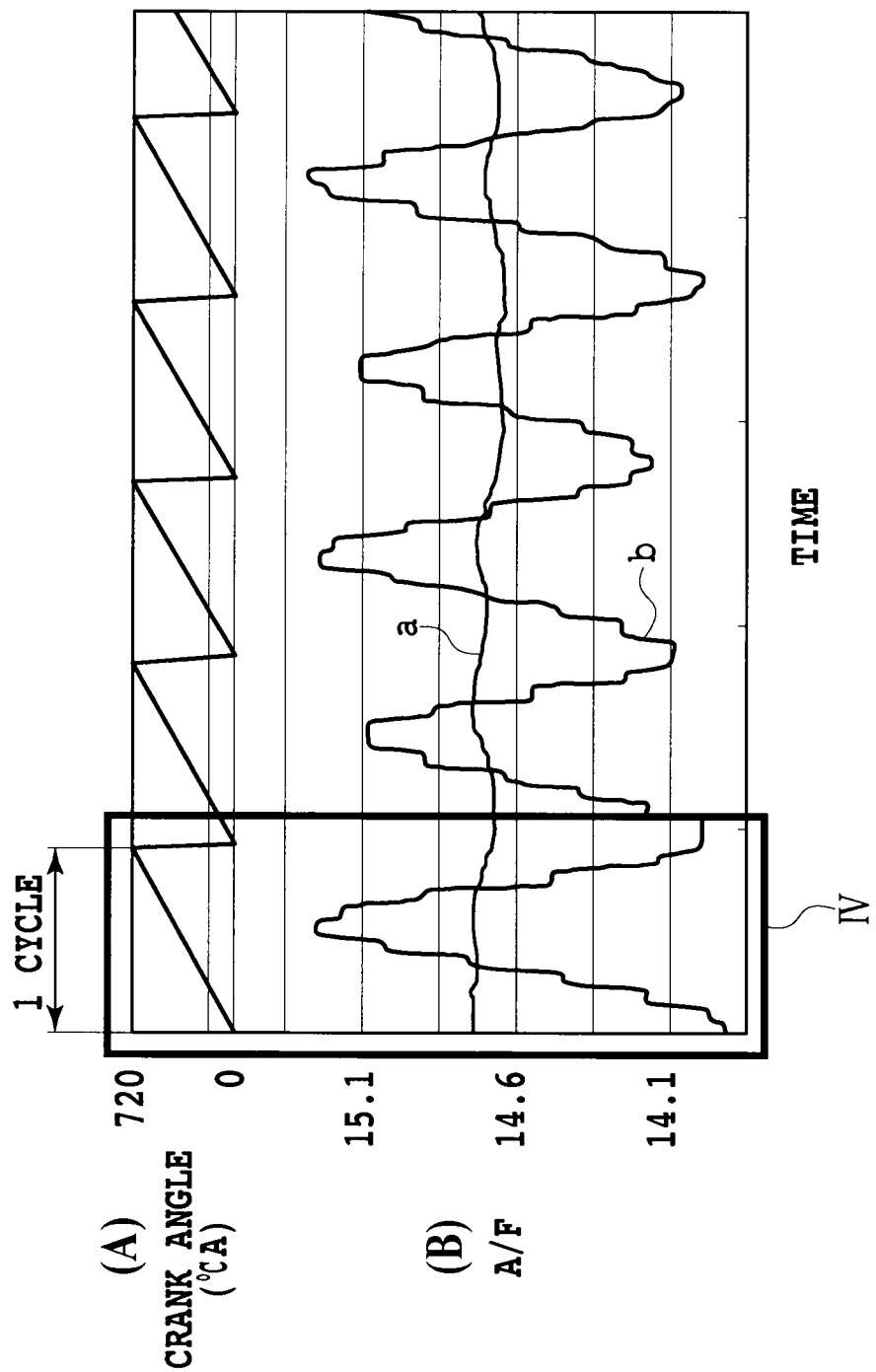
FIG. 3 is a graph illustrating fluctuation in an air-fuel ratio sensor output according to the atmospheric pressure.

As illustrated in FIG. 3, the exhaust air-fuel ratio A/F detected by the pre-catalyst sensor 17 tends to cyclically fluctuate having 1 engine cycle (=720° CA) as one cycle. If dispersion in the air-fuel ratio between cylinders occurs, the fluctuation in 1 engine cycle becomes larger. An air-fuel ratio diagram "a" in FIG. 3B illustrates the case in which the WGV 27 is closed, and a diagram "b" illustrates the case in which the WGV 27 is open, respectively. As illustrated, if the WGV 27 is closed, the amplitude of the air-fuel ratio fluctuation is relatively small. FIG. 3 is shown schematically for facilitating understanding.

Here, an imbalance rate (%) is a parameter indicating a degree of dispersion in the air-fuel ratio between cylinders. That is, the imbalance rate is a value which indicates, when a fuel injection amount is deviated in only one cylinder among all the cylinders, at what rate the fuel injection amount of the cylinder whose fuel injection amount is deviated (imbalanced cylinder) is deviated from the fuel injection amount of the cylinder whose fuel injection amount is not deviated (balanced cylinder), that is, a reference fuel injection amount. Assuming that the imbalance rate is IB, the fuel injection amount of the imbalanced cylinder is Qib, and the fuel injection amount of the balanced cylinder, that is, the reference injection amount is Qs, it is expressed as IB=(Qib−Qs)/Qs. The larger the imbalance rate IB is, the larger the fuel injection amount deviation of the imbalance cylinder would be with respect to the balanced cylinder, and the larger the degree of dispersion in the air-fuel ratio would be.

[Detection of Dispersion Abnormality in Air-Fuel Ratio Between Cylinders]

As can be understood from the above explanation, if dispersion abnormality in air-fuel ratio occurs, fluctuation in the pre-catalyst sensor output becomes large. Thus, by monitoring the fluctuation degree, the dispersion abnormality in air-fuel ratio can be detected. In this embodiment, a fluctuation parameter, which is a parameter correlating with the fluctuation degree of the pre-catalyst sensor output, is calculated, and this fluctuation parameter is compared with a predetermined abnormality determination value so as to detect dispersion abnormality.

Figure 4:
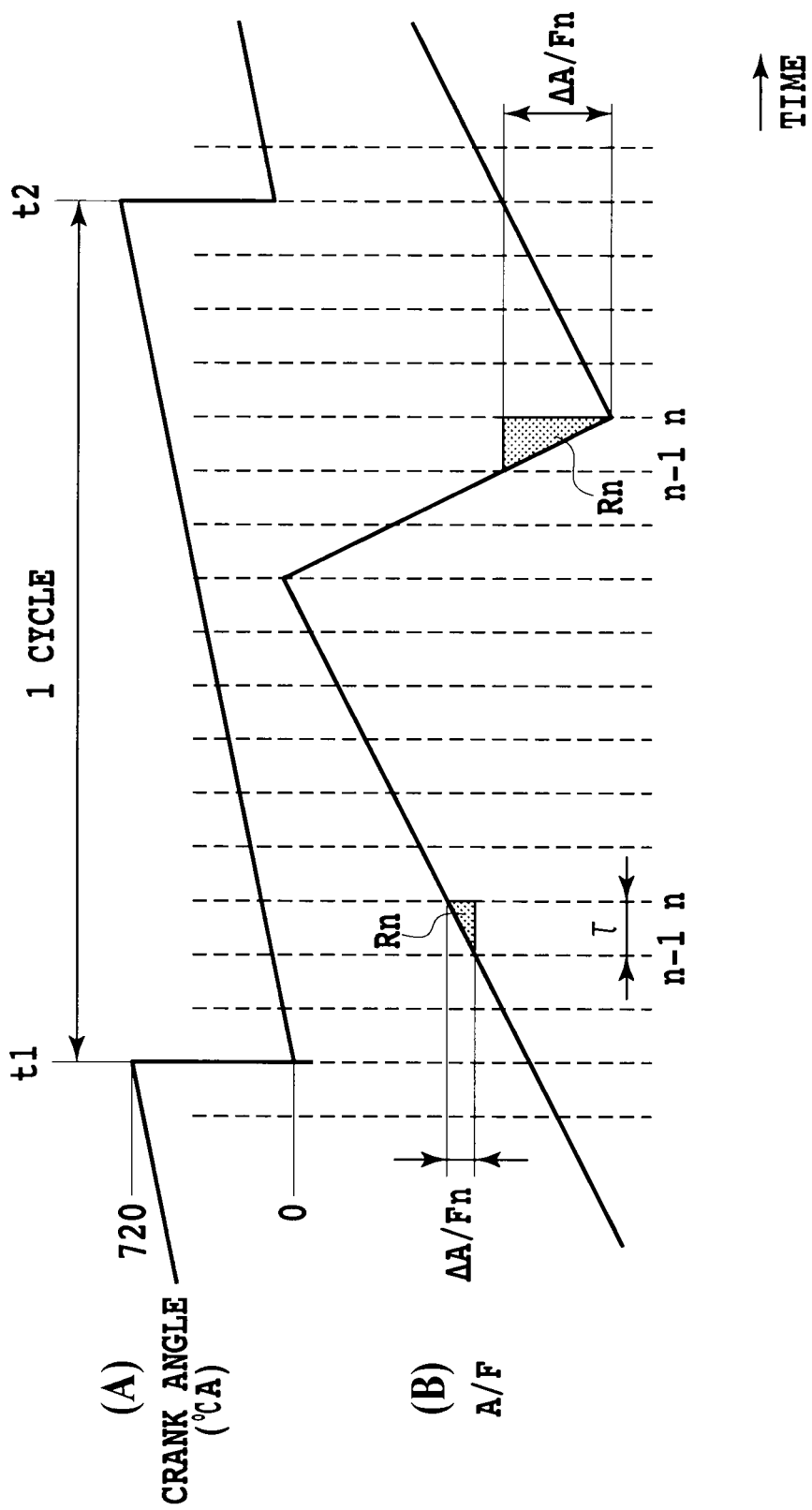
FIG. 4 is an enlarged view corresponding to IV part in FIG. 3.

Here, the calculation method of the fluctuation parameter will be described. FIG. 4 is an enlarged diagram corresponding to IV part in FIG. 3 and particularly shows fluctuation in the pre-catalyst sensor output in 1 engine cycle. Here, as the pre-catalyst sensor output, a value obtained by converting the output voltage Vf of the pre-catalyst sensor 17 to the air-fuel ratio A/F is used. However, the output voltage Vf of the pre-catalyst sensor 17 can be directly used.

As illustrated in the figure (B), the ECU 22 obtains the value of the pre-catalyst sensor output A/F at every predetermined sampling cycle τ (unit time or 4 ms, for example) in 1 engine cycle. Then, a difference $\Delta A/F_n$ between the value $A/F_n$ obtained at the current timing (second timing) and the value $A/F_{n-1}$ obtained at the previous timing (first timing) is acquired by the following formula (1). This difference $\Delta A/F_n$ can be also referred to as a differential value at the current timing, or inclination.

[Formula 1]

$$\Delta A/F_n = A/F_n - A/F_{n-1} \quad (1)$$

Most simply speaking, the difference $\Delta A/F_n$ indicates the fluctuation in the pre-catalyst sensor output. That is because, the larger the fluctuation degree becomes, the larger the inclination in the air-fuel ratio diagram would become in an absolute value, and the larger the difference $\Delta A/F_n$ would become in an absolute value. Thus, the value of the difference $\Delta A/F_n$ can be used as a fluctuation parameter at one predetermined timing.

However, for improvement of accuracy in this embodiment, an average value of a plurality of the differences $\Delta A/F_n$ is used as the fluctuation parameter. In this embodiment, the difference $\Delta A/F_n$ is integrated at each timing in one engine cycle, the final integrated value is divided by the number of samples N, and the average value of the difference $\Delta A/F_n$ in one engine cycle is acquired. Moreover, the average value of the difference $\Delta A/F_n$ is integrated for the M engine cycles (M=100, for example), and the final integrated value is divided by the number of cycles M so as to acquire the average value of the difference $\Delta A/F_n$ in the M engine cycles.

The larger the fluctuation degree of the pre-catalyst sensor output is, the larger the average value of the difference $\Delta A/F_n$ in an M engine cycle would become in an absolute value. Thus, if the average value in an absolute value is not less than a predetermined abnormality determination value, it is determined that there is dispersion abnormality, while if the average value is smaller than the abnormality determination value, it is determined that there is no dispersion abnormality, that is, it is normal.

Since the pre-catalyst sensor output A/F increases or decreases depending on the case, the difference $\Delta A/F_n$ or the average value thereof is acquired only for one of these cases, and this value can be used as the fluctuation parameter. Particularly if only one cylinder is deviated to the rich side, when the exhaust gas corresponding to the cylinder is received by the pre-catalyst sensor, the output is rapidly changed to the rich side (that is, rapidly decreases), and the value only on the decrease side can be used for detection of the deviation to the rich side (i.e. rich dispersion determination). In this case, only the downward-sloping region in the graph in FIG. 4B is used for detection of the deviation to the rich side. Transition from the lean side to the rich side is made more rapidly than the transition from the rich side to the lean side in general, and the deviation to the rich side can be expected to be detected with accuracy by this method. It is needless to say that this method is not limiting but only the value on the increase side can be used or the values of both the decrease side and the increase side can be used (the absolute values of the differences $\Delta A/F_n$ are integrated and this integrated value is compared with a threshold value).

Also, any value correlating with the fluctuation degree of the pre-catalyst sensor output can be used as the fluctuation parameter. For example, the fluctuation parameter can be calculated on the basis of a difference between the maximum value and the minimum value of the pre-catalyst sensor output in one engine cycle (so-called peak-to-peak). That is because the larger the fluctuation degree of the pre-catalyst sensor output is, the larger the difference would become.

In an internal combustion engine having a turbo charger, if an air-fuel ratio sensor is disposed on the downstream side of a turbine of the turbo charger, the exhaust gas is agitated by the passage of exhaust gas emitted from each cylinder through the turbine, and dispersion may not be detected with good accuracy. For example, as described above, as illustrated in FIG. 3, even in an engine whose dispersion in the values of A/F is remarkable if measurement (curve b) is made in a state in which the WGV 27 is open, measurement (curve a) in a state in which the WGV 27 is closed does not show a remarkable dispersion in the values of A/F. Thus, if dispersion abnormality in the air-fuel ratio is detected regardless of the operated state of the WGV 27, detection accuracy might deteriorate, and misdetection might occur. Considering such a phenomenon, in this embodiment, deterioration of detection accuracy is suppressed by the following abnormality detection routine.

[Detection Routine of Dispersion Abnormality in Air-Fuel Ratio Between Cylinders]

Figure 5:
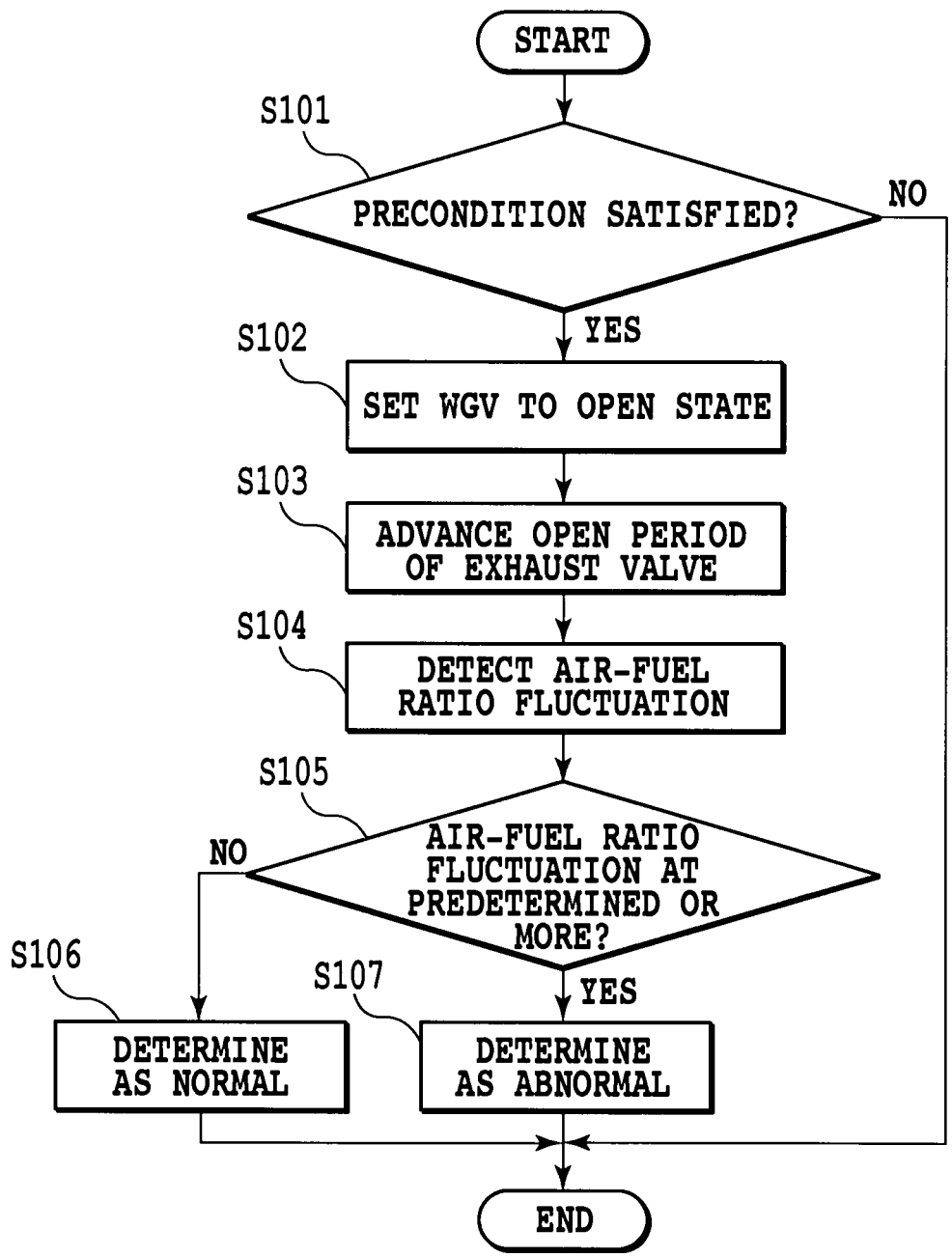
FIG. 5 is a flowchart illustrating a routine for detecting dispersion abnormality in the air-fuel ratio between cylinders in the first embodiment.

Subsequently, the routine for detecting dispersion abnormality in air-fuel ratio between cylinders will be described by using FIG. 5.

First, at Step S101, it is determined whether or not a predetermined precondition suitable for making abnormality detection is satisfied. This precondition is satisfied if each of the following conditions is satisfied:

(1) Warming-up of the engine has been completed. If the water temperature detected by the water-temperature sensor 23 is at a predetermined temperature or above, for example, it is determined that warming-up has been completed.

(2) At least the pre-catalyst sensor 17 has been activated.

(3) The engine is in the steady operation.

(4) In the stoichiometric control.

(5) The engine is operating within a detection region.

(6) The output A/F of the pre-catalyst sensor 17 is decreasing.

The condition (6) in the above indicates that this routine depends on the above-described rich dispersion determination (the method in which only the value on the decrease side is used for detection of deviation to the rich side). If the preconditions are not satisfied, the routine is finished.

On the other hand, if the preconditions are satisfied, the WGV 27 is set to an open state (S102). As a result, the exhaust gas not passing through the exhaust turbine 25b but flowing through the waste gate passage 26 is supplied to the pre-catalyst sensor 17.

Figure 6:
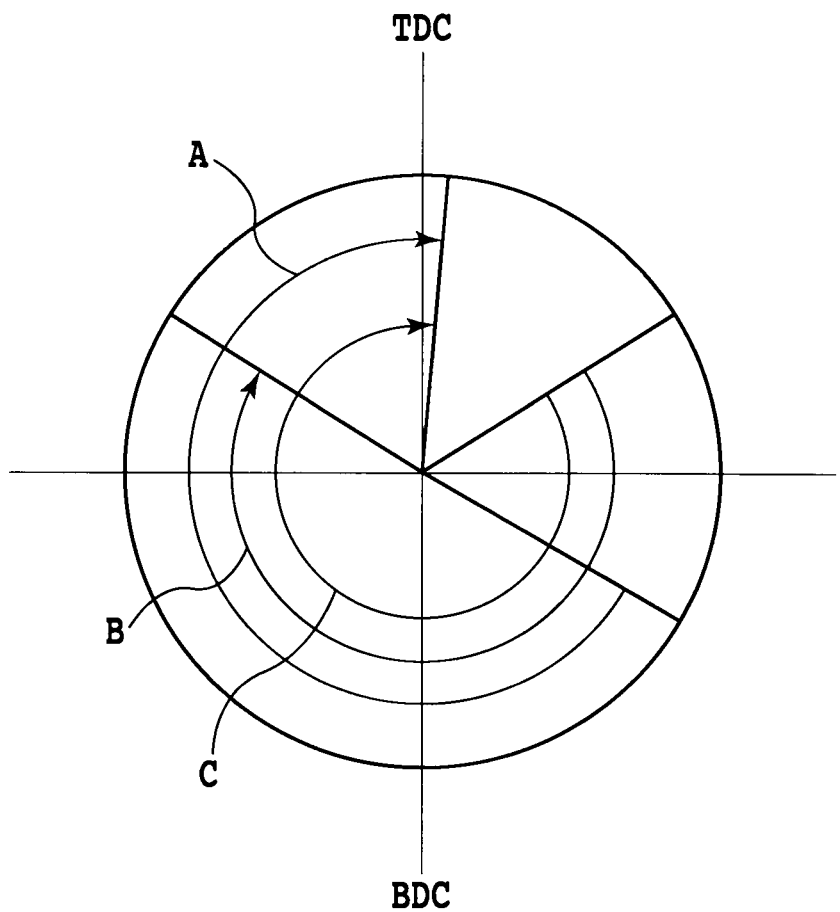
FIG. 6 is a timing chart illustrating an open period of an exhaust valve.

Further, the opening timing of the exhaust valve is advanced (S103). In this case, as illustrated in FIG. 6, an open period B in which start is advanced from an open period A for the usual operation is employed, and applied to the exhaust valve. As a result, since the exhaust valve is opened in a state of a high in-cylinder pressure, an exhaust flow velocity is raised, and exhaust gas mixture in each cylinder in the exhaust port is suppressed. That is, since the exhaust gas is emitted quickly to the downstream side by inertia, a phenomenon in which the exhaust gas from one cylinder enters the exhaust port continuing to another cylinder is suppressed.

Subsequently, the air-fuel ratio fluctuation is detected (S104). Here, the output $A/F_n$ of the pre-catalyst sensor 17 (air-fuel ratio sensor) at the current timing is obtained, and the output difference $\Delta A/F_n$ at the current timing is calculated by the above formula (1) and stored. Then, the processing is repeatedly executed till 100 cycles are finished. When 100 cycles are finished, the average value $\Delta A/F_{AV}$ of the output difference $\Delta A/F_n$ calculated so far is calculated by dividing the integrated value of the difference $\Delta A/F_n$ by the number of samples N and the number of engine cycles M, for example, as described above. This average value $\Delta A/F_{AV}$ indicates the air-fuel ratio fluctuation.

Then, it is determined whether or not the absolute value of the average value $\Delta A/F_{AV}$ of the difference $\Delta A/F_n$ is larger than a predetermined abnormality threshold value $\alpha$ (S105). If the absolute value of the average value $\Delta A/F_{AV}$ is smaller than the abnormality threshold value $\alpha$, the routine proceeds to Step S106, where it is determined that there is no dispersion abnormality, that is, the value is normal, and the routine is finished.

On the other hand, if the absolute value of the average value $\Delta A/F_{AV}$ is at the abnormality threshold value a or more, the routine proceeds to Step S107, where it is determined that there is dispersion abnormality, that is, the value is abnormal, and the routine is finished. At the same time with the abnormality determination or if the abnormality determination is made 2 trips consecutively (that is, one trip from the engine start to stop is repeated twice consecutively), it is desirable that an alarm device such as a check lamp is started in order to notify the user of the fact of the abnormality, and the abnormality information is stored in predetermined diagnosis memory in a mode that can be called by a maintenance worker.

As the result of such a series of processing, in this embodiment, in a state in which the WGV 27 is set to the open state (S102), and the opening timing of the exhaust valve is advanced (S103), the dispersion abnormality in air-fuel ratio between cylinders is detected. As a result, leveling of the air-fuel ratio by an influence of the turbine is suppressed, exhaust mixture in each cylinder in the exhaust port is suppressed, and detection accuracy can be improved.

In this embodiment, the open period B illustrated in FIG. 6 is equal to the open period A in the length (crank angle) thereof. However, the start timing may be advanced while the end timing is made equal to that in the open period A as in an open period C.

Subsequently, a second embodiment of the present invention will be described. In the second embodiment illustrated in FIGS. 7 and 8, when dispersion abnormality in air-fuel ratio between cylinders is to be detected, in order to increase the speed of exhaust gas, the opening timing of the exhaust valve is set within the exhaust stroke. Since the mechanical configuration of the second embodiment is the same as that of the first embodiment, explanation of the detail will be omitted.

Figure 7:
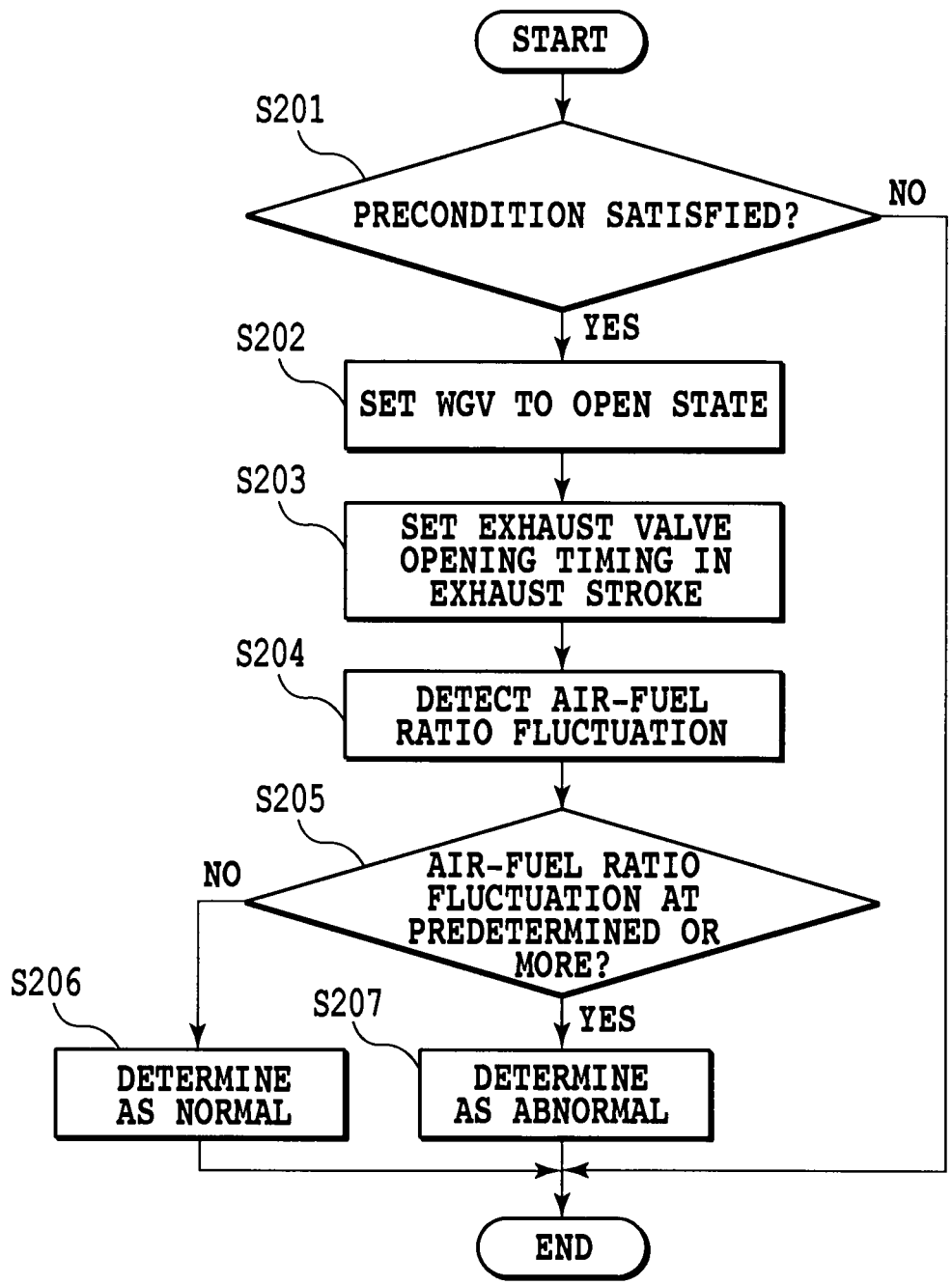
FIG. 7 is a flowchart illustrating a routine for detecting dispersion abnormality in the air-fuel ratio between cylinders in a second embodiment.

Processing in the ECU 22 of the second embodiment will be described. In FIG. 7, the processes at Step S201 and Step S202 are the same as those in Step S101 and Step S102 in the first embodiment.

Figure 8:
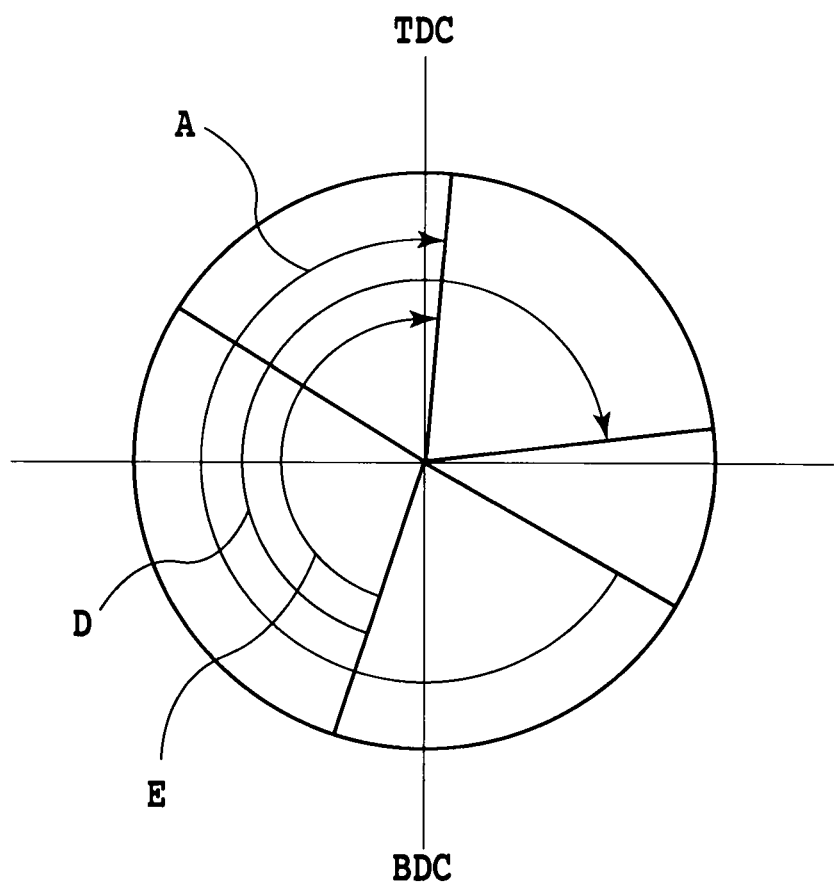
FIG. 8 is a timing chart illustrating the open period of the exhaust valve.

After the processing at Step S202 is finished, the opening timing of the exhaust valve is set within the exhaust stroke (S203). In this case, as illustrated in FIG. 8, an open period D in which the start timing, that is, the opening timing, is delayed as compared with the open period A in the usual operation and set within the exhaust stroke, is employed and applied to the exhaust valve. As a result, the exhaust valve is opened in a state in which the in-cylinder pressure is high and there is a scavenging effect by a piston, and the exhaust flow velocity is raised, and the exhaust gas mixture in each cylinder in the exhaust port is suppressed. That is, since the exhaust gas is emitted quickly to the downstream side by inertia, the phenomenon in which the exhaust gas from one cylinder enters the exhaust port continuing to another cylinder is suppressed.

The processes from Step S204 to Step S207 are the same as those from Step S104 and S107 in the first embodiment.

As the result of such a series of processing, in this embodiment, leveling of the air-fuel ratio by an influence of the turbine is suppressed, exhaust mixture in each cylinder in the exhaust port is suppressed, and detection accuracy can be improved similarly to the first embodiment.

Subsequently, a third embodiment of the present invention will be described. The third embodiment illustrated in FIG. 9 has a mechanical configuration having a plurality of exhaust valves for a single combustion chamber in which, when the dispersion abnormality in air-fuel ratio between cylinders is detected, some of the plurality of exhaust valves are stopped in the closed state in order to increase the exhaust speed. Preferably, one combustion chamber has two exhaust valves, but the number of exhaust valves may be more. The plurality of exhaust valves in one combustion chamber can be individually opened/closed and are controlled by the ECU 22. Since the remaining mechanical configuration of the third embodiment is the same as that of the first embodiment, explanation of the detail will be omitted.

Figure 9:
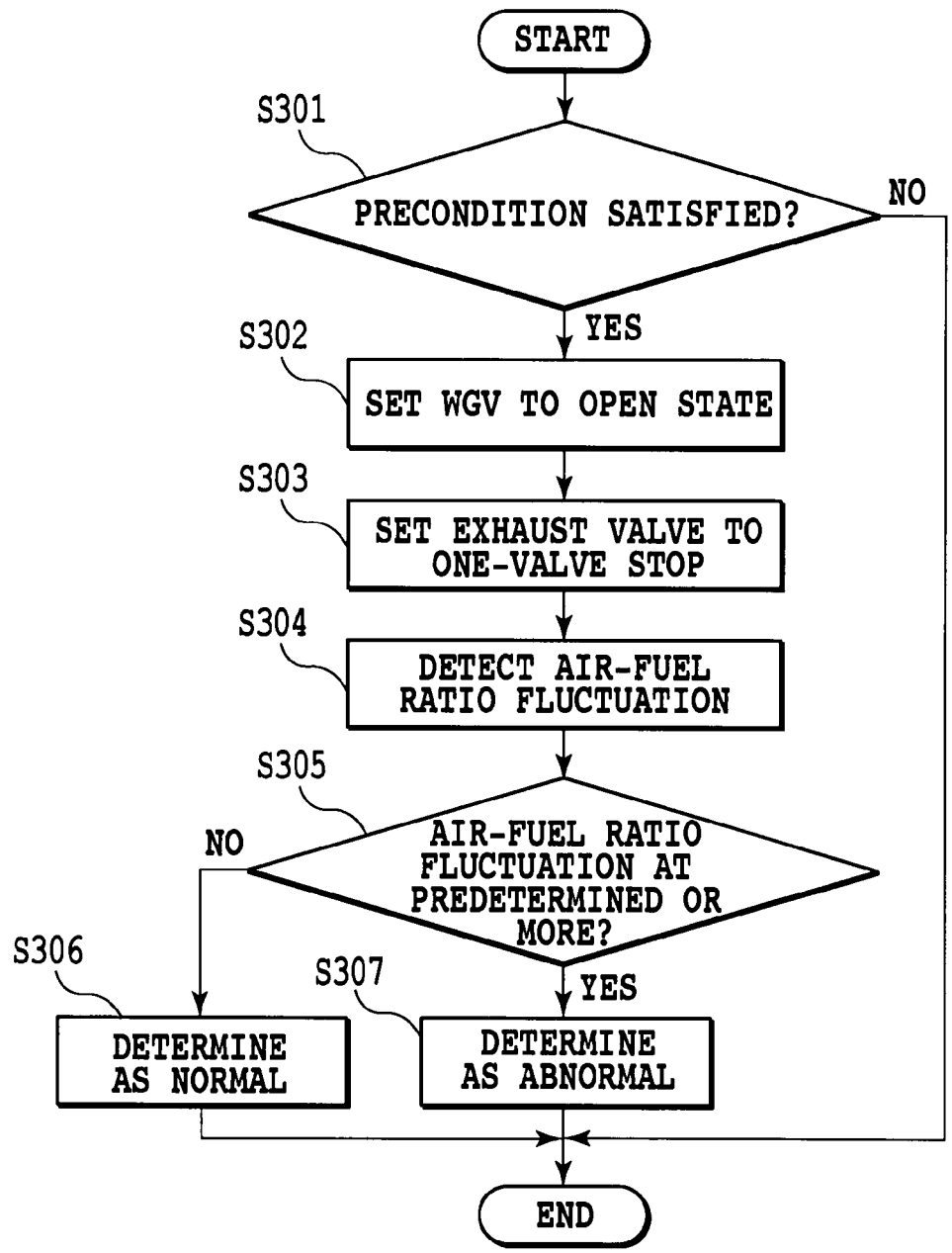
FIG. 9 is a flowchart illustrating a routine for detecting dispersion abnormality in the air-fuel ratio between cylinders in a third embodiment.

The processing in the ECU 22 of the third embodiment will be described. In FIG. 9, the processing at Step S301 and Step S302 is the same as those of Step S101 and Step S102 in the first embodiment.

After the processing at Step S302 is finished, a part of the plurality of exhaust valves in each combustion chamber is stopped in the closed state (S303). As a result, only the other exhaust valve is opened in the exhaust stroke. Since an opening sectional area of the combustion chamber is made narrower than that in the usual operation, the exhaust speed is increased, and the exhaust mixture in each cylinder in the exhaust port is suppressed. That is, since the exhaust gas is emitted quickly to the downstream side by inertia, the phenomenon in which the exhaust gas from one cylinder enters the exhaust port continuing to another cylinder is suppressed.

The processes from Step S304 to Step S307 are the same as those at Step S104 and Step S107 in the first embodiment.

As the result of such a series of processing, in this embodiment, leveling of the air-fuel ratio by an influence of the turbine is suppressed, exhaust mixture in each cylinder in the exhaust port is suppressed, and detection accuracy can be improved similarly to the first embodiment.

The embodiments of the present invention are not limited to the above-described embodiments but include any variations, applications, and equivalents included in the idea of the present invention specified by claims. Therefore, the present invention should not be understood in a limited manner but can be applied to other arbitrary technologies belonging to the scope of the idea of the present invention. Any means configured to solve the problems in the present invention can be used in combination with each other as much as possible.

For example, a means configured to increase the exhaust speed of the exhaust may be a means that reduces an opening degree of the exhaust valve than that in the usual operation, for example, in addition to those disclosed in each of the above embodiments. In this case, since the opening sectional area of the combustion chamber is made narrower than that in the usual operation, the exhaust speed is increased, whereby the same advantage as that when other exhaust speed increasing means is used can be obtained. The narrowing of the opening degree of the exhaust valve may be combined with another exhaust speed increasing means.

In each of the embodiments, the air-fuel ratio sensor output only in the decrease (at the change to the rich side) is used for detection of abnormality shift to the rich side. However, a mode in which the air-fuel ratio sensor output only in the increase (at the change to the lean side) is used, or a mode in which the air-fuel ratio sensor outputs both in the decrease and the increase are used, can be used. Not only the abnormality shift to the rich side, but also the abnormality shift to the lean side can be detected, and air-fuel ratio dispersion abnormality can be widely detected without distinguishing between the shift to the rich side and the shift to the lean side.

REFERENCE SIGNS LIST

1 internal combustion engine
3 combustion chamber
5 airflow meter
6 exhaust pipe
11 upstream catalyst
12 injector
14 exhaust manifold 17 pre-catalyst sensor
18 post-catalyst sensor
20 electronic control unit (ECU)
26 waste gate passage
27 waste gate valve (WGV)

The invention claimed is:

1. An apparatus for detecting air-fuel ratio dispersion abnormality between cylinders of a multiple-cylinder internal combustion engine, comprising:
   a turbo charger installed in association with the multiple-cylinder internal combustion engine;
   a waste gate passage which bypasses a turbine of said turbo charger;
   a waste gate valve which opens/closes said waste gate passage;
   an air-fuel ratio sensor installed in said exhaust passage on the downstream side of an outlet of said waste gate passage;
   an abnormality detecting unit configured to detect dispersion abnormality in air-fuel ratio between cylinders by comparing a value of a parameter correlating with a degree of fluctuation of an output of said air-fuel ratio sensor with a predetermined abnormality threshold value; and
   an exhaust speed increasing unit configured to increase the speed of an exhaust flow, and further comprising:
   a controller programmed to control said waste gate valve and said exhaust speed increasing unit; wherein
   said controller is further programmed to bring, when dispersion abnormality in the air-fuel ratio between cylinders is detected, the waste gate valve into an open state and to increase the speed of the exhaust flow by the exhaust speed increasing unit.

2. The apparatus according to claim 1, wherein
   said exhaust speed increasing unit executes, when the dispersion abnormality in the air-fuel ratio between cylinders is detected, at least one of:
   advancing opening timing of an exhaust valve compared to that in a usual operation;
   setting the opening timing of the exhaust valve within an exhaust stroke; and
   setting of an opening degree of the exhaust valve smaller than that in the usual operation.

3. The apparatus according to claim 1, wherein
   said multiple-cylinder internal combustion engine has a plurality of exhaust valves in a single combustion chamber; and
   said exhaust speed increasing unit stops some of said plurality of exhaust valves in the closed state when dispersion abnormality in the air-fuel ratio between cylinders is detected.

* * * * *